United States Patent [19]

Aldi

[11] Patent Number: 5,167,435
[45] Date of Patent: Dec. 1, 1992

[54] SEAT MECHANISM

[76] Inventor: A. Joseph Aldi, P.O. Box 8647, Incline Village, Nev. 89450

[21] Appl. No.: 774,065

[22] Filed: Oct. 9, 1991

[51] Int. Cl.$^5$ .............................................. B62J 1/00
[52] U.S. Cl. .................................... 297/201; 297/312
[58] Field of Search ......................... 297/201, 195, 312

[56] References Cited

U.S. PATENT DOCUMENTS

| | | |
|---|---|---|
| 603,734 | 5/1898 | Peck et al. . |
| 615,223 | 11/1898 | Peck . |
| 654,835 | 7/1900 | Mandle ............................ 297/201 X |
| 656,854 | 8/1900 | Nord . |
| 701,390 | 6/1902 | Provoost ............................ 297/201 |
| 749,865 | 1/1904 | Jarvis . |
| 1,881,136 | 10/1932 | Schmidt . |
| 3,883,173 | 5/1975 | Shephard et al. .............. 297/201 X |
| 4,063,775 | 12/1977 | Mesinger . |
| 4,089,559 | 5/1978 | Prange et al. . |
| 4,502,727 | 3/1985 | Holcomb et al. . |
| 4,512,608 | 4/1985 | Erani . |
| 4,541,668 | 9/1985 | Rouw . |

FOREIGN PATENT DOCUMENTS

| | | |
|---|---|---|
| 192629 | 1/1907 | Fed. Rep. of Germany ...... 297/201 |
| 827008 | 11/1951 | Fed. Rep. of Germany ...... 297/201 |
| 373620 | 5/1907 | France . |
| 8579 | of 1913 | United Kingdom . |

Primary Examiner—Peter R. Brown
Attorney, Agent, or Firm—Merchant, Gould, Smith, Edell, Welter & Schmidt

[57] ABSTRACT

An improved seat mechanism for use in supporting the operator of a bicycle, exercise machine, moped, motorcycle or similar device is described, having seat extensions pivotally connected to the sides of the rear seating area. The seat extensions are normally positioned at a downward angle when the seat is unloaded to facilitate easy mounting of the device and, upon mounting, the seat extensions automatically rotate upward to a substantially horizontal position adjacent the rear seating area of the seat to provide increased seating area and support for the operator, while at the same time easing the mounting/dismounting of the seat.

8 Claims, 3 Drawing Sheets

SEAT MECHANISM

FIELD OF THE INVENTION

The present invention relates to seats or saddles used for supporting a person operating a device such as a bicycle, exercise machine, moped, motorcycle or similar device.

BACKGROUND OF THE INVENTION

Numerous types of seats and saddles have been developed for use with devices such as bicycles, exercise machines, mopeds or motorcycles in which a rider is supported in the seated position and must substantially straddle the device. The main function of the seat in such devices is to support the user while providing as much comfort as possible.

Many seats, such as those disclosed in U.S. Pat. Nos. 1,881,136 and 656,854, utilize various springs in support of the seat to provide shock absorption. In addition, typical seats have a one-piece wide rear portion which narrows in the front, with the one-piece rear portion designed to provide most of the support for the user. To increase the comfort, it is advantageous to provide as large a seating area in the rear of the seat as possible. A wide rear seating area, however, makes it difficult for the user to mount and dismount the seat. To minimize this problem, many seats have a relatively small rear seating area, resulting in reduced support and comfort for the rider.

An attempted solution to this problem is to have movable side extensions stored underneath the seat. British Patent No. 8579 illustrates such a seat having lateral seat extensions which are movable from a folded position underneath the main seat section to an extended position adjacent the rear portion of the main seat section. With this design, however, the rider must first mount the bike and then manually extend the seat extensions, which could prove difficult and/or dangerous in practice. In addition, the seat extensions must be manually retracted before the rider dismounts the bicycle which also could cause problems.

SUMMARY OF THE INVENTION

The present invention provides a seating mechanism for a bicycle, exercise machine, moped, motorcycle or other similar device. The seating mechanism comprises seat extensions pivotally connected to the sides of the rear seating area of the seat to automatically provide increased seating area for greater comfort and support, while at the same time easing the mounting/dismounting of the seat.

The seat extensions are normally positioned at a downward angle when the seat is unloaded to facilitate easy mounting of the bike and, upon mounting of the bike, the seat extensions automatically rotate upward to a substantially horizontal position adjacent the rear seating area to provide increased seating area and support for the rider. It is preferred that the extensions rotate to a position above horizontal to cup the rider on the upper surface of the seat.

In the preferred embodiment, a seat is provided including a central seating member and two seat extensions pivotally attached to the sides of the central seating member. The spring is preferably fully compressed when a rider is mounted on the seat. Alternative, the central seating member is supported by a spring which can act as a shock absorber to suspend the central seating member. The spring is located on a mounting post and the seat extensions are preferably pivotally connected to the mounting post via two linking bars. When the seat is in an unloaded position, the spring biases the central seating member to an upper position while the linking bars constrain the seat extensions to a position having a downward angle (from horizontal), thus allowing for easy mounting of the bike. Upon mounting of the bike, the weight of the rider forces the central seating member in a downward direction along the mounting post. This central seating member movement is automatically accompanied by the upward rotation of the seat extensions about the sides of the central seating member. The seat extensions rotate to a substantially horizontal position adjacent the rear seating area of the central seating member. In such a position, the seat extensions provide increased seating area and support for the rider.

These and other features and advantages of the present invention will become more apparent from the following detailed description, when taken in conjunction with the accompanying drawings.

DETAILED DESCRIPTION OF THE PREFERRED EMBODIMENTS

While the invention will be described and disclosed in connection with certain preferred embodiments, the description is not intended to limit the invention to those specific embodiments, rather it is intended to cover all such alternative embodiments and modifications as fall within the spirit and scope of the invention as defined by the claims and equivalents thereof.

Figure 1:
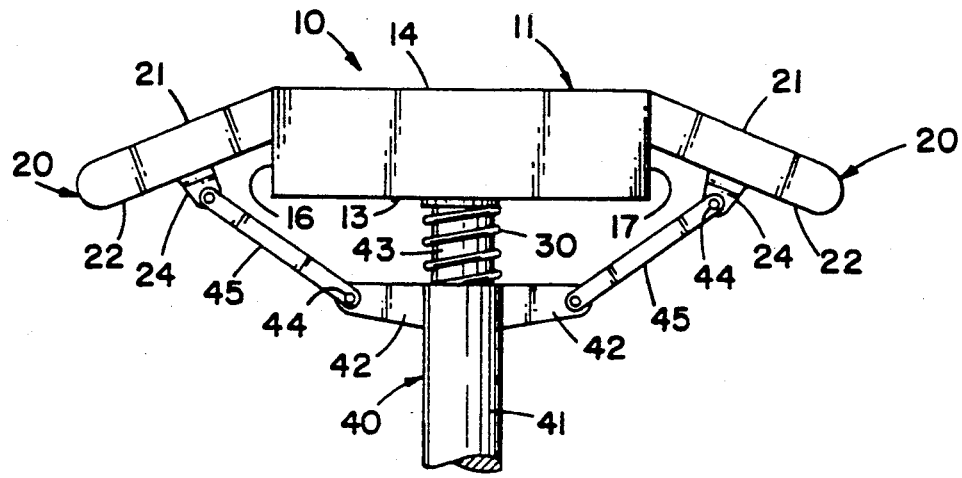
FIG. 1 is a rear elevational view of the seat mechanism in an unmounted position.
Figure 2:
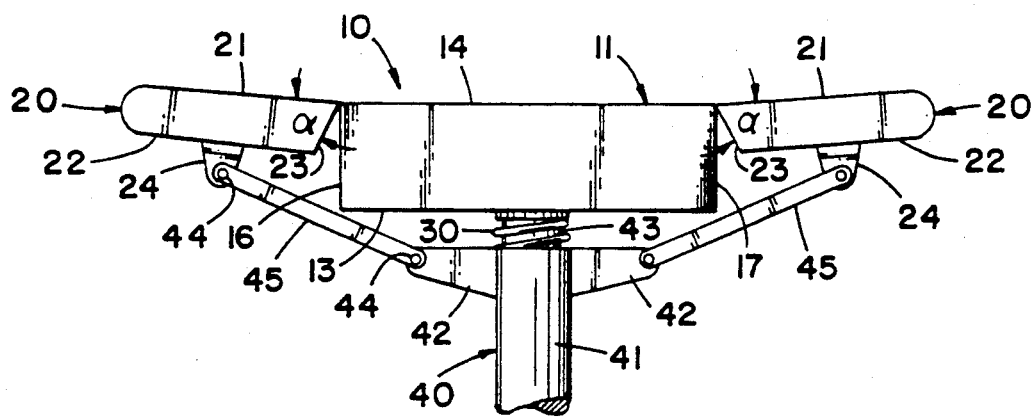
FIG. 2 is a rear elevational view of the seat mechanism in a mounted position.
Figure 4:
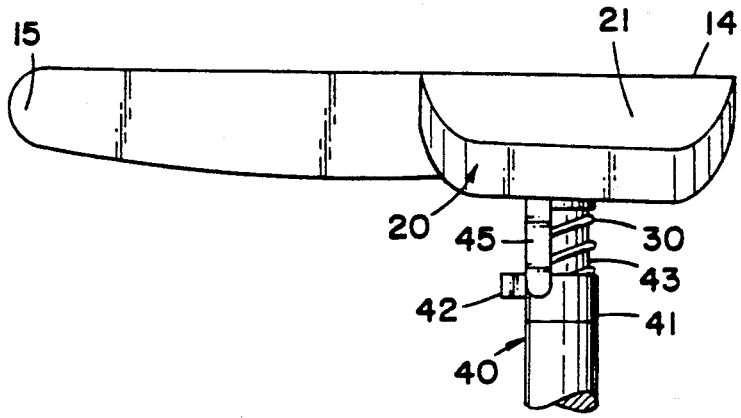
FIG. 4 is a side elevational view of the seat mechanism in an unmounted position.
Figure 3:
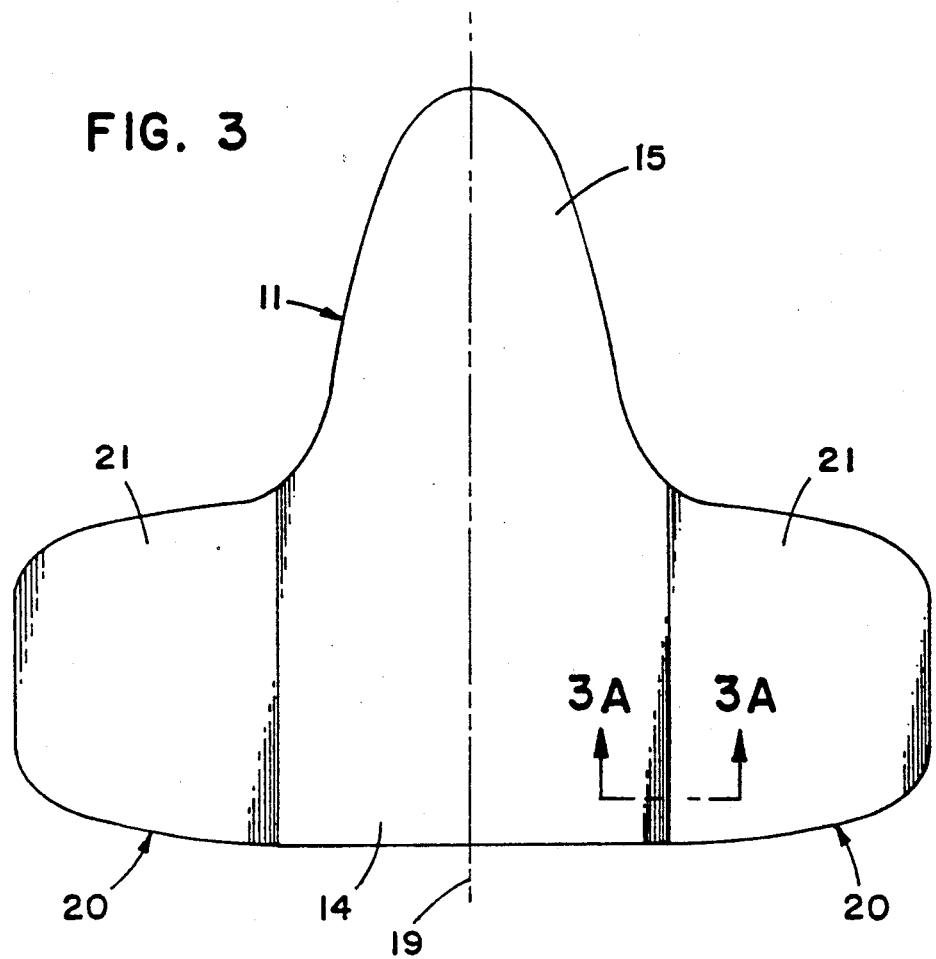
FIG. 3 is a top plan view of the seat mechanism.

Turning now to the drawings, a seat mechanism 10 for use on a bicycle or other similar type of device is illustrated in FIGS. 1-4. The seat mechanism 10 includes a central seating member 11 having a rear seating area 14 and a narrowing front horn section 15, as illustrated in FIG. 3. In accordance with the preferred embodiment, two seat extensions 20 are provided to increase the seating area of the seat mechanism 10. The seat extensions 20 are disposed adjacent the sides 16, 17 of the rear seating area 14 and extend laterally outward with respect to the longitudinal axis 19 of the central seating member 11.

Figure 3A:
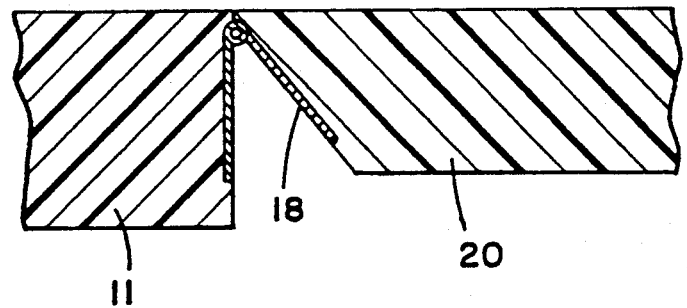
FIG. 3A is a partial cross-sectional view taken along line A—A in FIG. 3.

The seat extensions 20 are pivotally attached to the central seating member 11. As best shown in FIG. 3A, in the preferred embodiment a hinge 18 is disposed between the inner side 23 of each seat extension 20 and the side 16 or 17 of the central seating member 11 to pivotally connect the seat extensions 20 to the central seating member 11. It will be understood by those skilled in the art that various types of hinges or other similar devices can be utilized to accomplish the pivoting of the seat extensions 20 about the central seating member 11.

In the preferred embodiment, the central seating member 11 is supported by a spring 30 on mounting post 40. The spring 30 is disposed between the underside 13 of the central seating member 11 and the main section 41 of the mounting post 40 as illustrated in FIG. 1. The mounting post 40 includes an upper stem portion 43 around which the spring 30 is disposed such that the spring 30 is contained around stem portion 43 between central seating member 11 and the main portion 41 of mounting post 40. In the preferred embodiment, the stem portion 43 is received into the main portion 41 of the mounting post 40 as the seat moves downward in response to pressure from a mounted rider. Alternatively, the underside 13 of the central seating member 11 can include an opening (not shown) which is adapted to receive the stem portion 43 of the mounting post as the seat moves downward in response to pressure from a mounted rider.

It will be appreciated by those skilled in the art that although in the illustrated embodiments use a spring to support the central seating member 11, any similar mechanisms including, but not limited to, piston-type shock absorbers or the like can be substituted in the place of the springs shown.

The central seating member 11 is vertically displaceable on the stem portion 43 as illustrated in FIGS. 1 and 2 with the spring 30 compressing when a load such as a rider is placed on the central seating member 11. In the preferred embodiment, the central seating member 11 is depressed to rest on stem portion 43, with spring 30 compressed the necessary amount to accomplish that purpose. Alternatively, the spring 30 can act as a shock absorber in supporting the central seating member 11 to increase the rider's comfort. In that embodiment, spring 30 must be chosen with appropriate strength to at least partially support a rider of the bicycle or other device during the dynamic forces that accompany the movement of such devices and their operators. With such a configuration, the spring 30 biases the central seating member to an upper position while the linking bars 45 constrain the seat extensions 20 as shown in FIG. 1. In this unmounted position, the downward angle of the seat extensions 20 makes it easy for a person to mount the bicycle or other device.

In the preferred embodiment, seat extensions 20 are biased at a downward angle below the horizontal when no load is present on the central seating member 11. This is accomplished by constraining the movement of the seat extensions 20 through the use of linking bars 45. The linking bars 45 are pivotally connected at one end to lugs 24 attached to the underside 22 of the seat extensions 20 with the lower end of each bar 45 preferably connected to flanges 42 extending outward from the main section 41 of the mounting post 40. The pivoting connections are accomplished through the use of pins 44 or other similar connectors which allow rotation.

It will, however, be understood that the lower ends of bars 45 can alternately be connected to any fixed points that are not a part of mounting post 40. This could include the frame of a bicycle or other device. The illustrated and preferred design, however, allows use of the present invention on an existing device without modification other than replacement of the seat post and seat.

It should be noted that, in the preferred embodiment, the downward angle of the seat extensions 20 is limited by the inner sides 23 of the seat extensions which abut the sides 16, 17 of the central seating member 11 when the seat mechanism is in the unmounted position. As such, the angle α of the inner side 23 of the seat extensions should be chosen to restrain the seat extensions at a sufficient downward angle for easy mounting of the bicycle. It will be understood that the downward angle could also be limited by the bars 45 in conjunction with the inner sides 23, or, in the alternative, the downward angle could be limited solely by the bars 45.

The seat extensions 20 pivot from their downward position to a substantially horizontal position when a load, such as a rider, is placed on the central seating member 11. Referring to FIG. 2, upon mounting the weight of the rider on the central seating member 11 compresses the spring 30 and displaces the central seating member to a lower position. In conjunction with this downward movement of the central seating member 11, the linking bars 45 serve to rotate the seat extensions 20 upward around the hinges 18.

The rotation of the seat extensions 20 is limited primarily by the downward displacement of the central seating member 11. In the preferred embodiment the rotation places the upper surface 21 of the seat extensions at an angle slightly above horizontal, essentially cupping the rider in the seat 10. It will be understood that any desired amount of rotation can, however, be provided for in the design of the seat of the present invention. In any mounted position, the seat extensions 20 provide additional seating area for the rider, thus increasing the comfort and support of the seat.

Referring to FIG. 1, when the rider dismounts from the seat, the spring 30 raises the central seating member 11 along stem extension 43 which correspondingly pivots each seat extension 20 about its respective hinge 18 to a downward angle with respect to horizontal. In such a position, the rider may easily dismount the bicycle.

Figure 5:
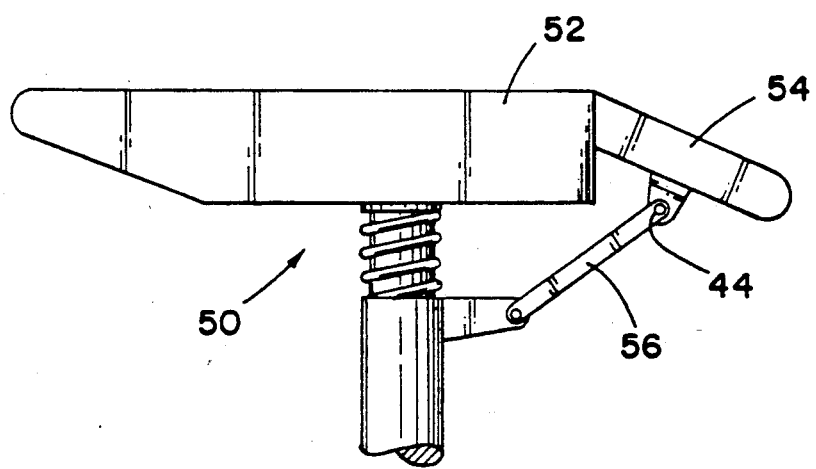
FIG. 5 is a rear elevational view of an alternate seat mechanism in an unmounted position.

An alternate preferred embodiment is illustrated in FIG. 5, having only one seat extension 54 attached to the seating member 52. In this embodiment, the seat 50 should be mounted and dismounted from the side of extension 54 to realize the advantages of the present invention. The seat extension 52 rotates in substantially the same manner as described above with respect to seats having two extensions.

Although specific embodiments of the present invention have been illustrated and described herein, it will be appreciated by those of ordinary skill in the art that any arrangement which is calculated to achieve the same purpose may be substituted for the specific embodiments shown. The illustrated embodiments are not intended to be exhaustive or to limit the invention to the precise embodiments shown. Many modifications and variations are possible in light of the above teaching. It is manifestly intended that this invention be limited only by the claims and the equivalents thereof.

What is claimed is:

1. A seating apparatus adapted to support a rider of a bicycle or other similar device, comprising:
    a central seat member having a front, back and two opposing lateral sides;
    a seat post supporting said central seat member;
    at least one seat extension, each of said extensions being pivotally connected to one of the sides of said central seat member;
    a resilient member coaxial with said seat post, said resilient member biasing said central seat member in an upper position and each of said seat extensions in a downwardly disposed position; and means for automatically pivoting each of said seat extensions about the sides of said central seat member from said downwardly disposed position to a position resiliently supporting the rider when said central seat member is in a lower position.

2. The apparatus of claim 1, wherein each of said seat extensions is connected to the side of said central seat member by a hinge.

3. The apparatus of claim 1, comprising two seat extensions, one extension located on each side of said central seating member.

4. The apparatus of claim 1, wherein said resilient member further comprises a spring adapted to support said central seat member in the upper position.

5. The apparatus of claim 1, wherein said pivoting means further comprises a linking bar corresponding to each of said seat extensions, each of said linking bars pivotally connected on an upper end to said seat extension and pivotally connected on a lower end to a fixed position; whereby each of said seat extensions pivots about the sides of said central seat member from a downwardly disposed position to a position supporting the rider when said central seat member is in a lower position.

6. The apparatus of claim 5, further comprising a seat post for supporting said central seat member in its upper and lower positions, wherein said fixed position is integral with said seat post.

7. The apparatus of claim 1, wherein said biasing means further provides shock absorption to suspend said central seat member between its upper position and a lower position.

8. A seating apparatus adapted to support a rider of a bicycle or other similar device, comprising:
  a central seat member having a front, back, two opposing lateral sides, and an upper surface for supporting said rider, said central seat member biased in an upper position;
  a seat post supporting said central seat member;
  two seat extensions, having an upper surface for supporting said rider, each of said extensions being pivotally connected along said opposing lateral sides of said central seat member and further being connected so that the upper surfaces of said central seat member and each of said seat extensions form a substantially continuous surface for supporting said rider;
  a resilient member coaxial with said seat post, said resilient member biasing said central seat member in said upper position; and
  a linking bar corresponding to each of said seat extensions, each of said linking bars pivotally connected on an upper end to said seat extension and pivotally connected on a lower end to said seat post; whereby each of said seat extensions pivots about said opposing lateral sides of said central seat member from said downwardly disposed position to a position supporting the rider when said central seat member is in a lower position.

* * * * *